United States Patent [19]

Kidon et al.

[11] Patent Number: 5,654,093
[45] Date of Patent: Aug. 5, 1997

[54] RELEASE-COATED ARTICLES AND MULTILAYER ARTICLES CONTAINING SAME

[75] Inventors: William E. Kidon, Chardon; Thanh V. Nguyen, Painesville; Tenhong V. Lee, Mentor, all of Ohio

[73] Assignee: Avery Dennison Corporation, Pasadena, Calif.

[21] Appl. No.: 476,745

[22] Filed: Jun. 6, 1995

Related U.S. Application Data

[63] Continuation of Ser. No. 204,772, Mar. 2, 1994, abandoned.
[51] Int. Cl.⁶ .................. B32B 7/12; B32B 9/06; B32B 27/10
[52] U.S. Cl. .................. 428/352; 428/354; 428/447; 428/452
[58] Field of Search .................. 428/352, 354, 428/447, 452

[56] References Cited

U.S. PATENT DOCUMENTS

| | | | |
|---|---|---|---|
| 3,726,710 | 4/1973 | Berger et al. | 117/93.31 |
| 3,878,263 | 4/1975 | Martin | 260/825 |
| 4,064,286 | 12/1977 | Hahn | 427/44 |
| 4,201,808 | 5/1980 | Cully et al. | 428/40 |
| 4,301,268 | 11/1981 | Kropac | 528/26 |
| 4,306,050 | 12/1981 | Koerner et al. | 528/26 |
| 4,568,566 | 2/1986 | Tolentino | 427/54.1 |
| 4,640,967 | 2/1987 | Eckberg | 528/26 |
| 4,678,846 | 7/1987 | Weitemeyer et al. | 525/477 |
| 4,908,274 | 3/1990 | Jachmann et al. | 428/452 |
| 4,963,438 | 10/1990 | Weltmeyer et al. | 428/447 |
| 4,978,726 | 12/1990 | Doaler et al. | 525/479 |
| 5,034,084 | 7/1991 | Schafer et al. | 156/278 |
| 5,034,491 | 7/1991 | Wewers et al. | 528/41 |

*Primary Examiner*—D. S. Nakarani
*Attorney, Agent, or Firm*—Renner, Otto, Boisselle & Sklar

[57] ABSTRACT

A radiation-curable silicone release composition is described which comprises (A) a mixture of organopolysiloxanes characterized by the formula $$RSi(CH_3)_2-O-(Si(CH_3)_2O)_n(Si(CH_3)(R)O)_mSi(CH_3)_2R \qquad (I)$$

wherein the mixture comprises (A-1) from about 25% to 95% by weight of at least one organopolysiloxane characterized by Formula I wherein each R is $-R^1-O(O)C-C(R^2)=CH_2$, $R^1$ is a hydrocarbylene group, $R^2$ is hydrogen or a methyl or ethyl group, m is a number from about 1 to about 15, and n is a number from about 50 to about 300, and (A-2) from about 5% to 75% by weight of at least one other organopolysiloxane characterized by Formula I wherein R is $-R^1-OCH_2CH(OH)-CH_2O(O)C-C(R^2)=CH_2$, $R^1$ is a hydrocarbylene group, $R^2$ is hydrogen or a methyl or ethyl group, m is a number from about 1 to about 25, and n is a number from about 50 to about 300, and (B) from 0% to about 5% by weight of a photoinitiator. A method of producing silicone release-coated substrates, the release-coated articles thus produced, and multi-layer articles or constructions incorporating a silicone-release layer also are described. When the silicone compositions are cured such as by electron beam radiation, the cured compositions exhibit a desirable high and controlled release force at high speeds such as the speeds utilized in label processing.

11 Claims, No Drawings

RELEASE-COATED ARTICLES AND MULTILAYER ARTICLES CONTAINING SAME

This is a continuation of application Ser. No. 08/204,772 filed on Mar. 2, 1994, now abandoned.

TECHNICAL FIELD OF THE INVENTION

This invention relates to radiation-curable silicone release compositions, and in particular, to electron beam radiation-curable silicone release compositions exhibiting high and controlled release values.

BACKGROUND OF THE INVENTION

Release coating compositions are used, for example, to coat papers or films which are to be used as a release backing, or a protective release sheet over the adhesive for pressure-sensitive labels, decals, tapes, etc. Labels which are provided with a pressure-sensitive adhesive still adhere to the release coated surface to a sufficient extent to enable the backing sheets with the adhesive labels thereon to be handled. However, it is essential that the labels can be readily separated from the release coated backing sheet without significantly reducing the adhesive forces on the back of the label. When such products are to be used, the release backing sheet is pulled off and discarded. It is desirable to be able to separate labels from the backing sheets at the high speeds normally used in label processing. The exposed pressure-sensitive adhesive is pressed onto a surface where the decal or label is to be placed. A common variety of release paper is one wherein one side of the paper (the release side) is coated with a polymeric siloxane material.

Silicones and silicone copolymers have been used extensively as release layers on paper, film, etc., because they are inherently low in surface energy. It is desirable that silicone-coated release papers and films have a release force which is low enough to enable the release paper to be easily removed from a pressure-sensitive adhesive-coated substrate but not so low that the release paper will become separated from the pressure-sensitive adhesive coating by forces normally encountered in the processing of the construction such as printing, die cutting and matrix stripping. "Release force" is defined as the amount of force required to peel or separate the release-coated substrate from the adhesive.

Polysiloxanes containing functional groups which can be radiation cured in the presence or absence of a photosensitizer have been described in various patents as useful silicone release compositions. U.S. Pat. No. 3,726,710 describes radiation-curable release compositions comprising an organopolysiloxane having olefinically unsaturated organic groups and a photosensitizer. The composition may be applied to a paper substrate and cured by exposure to high intensity radiation to produce a release coating.

U.S. Pat. No. 4,201,808 describes a release coating composition and release coated material which can be produced by applying to a substrate, for example, paper, a coating of a radiation-curable composition which comprises (a) from 10 to 90 weight percent of an organopolysiloxane containing an average of at least one acryloxy and/or methacryloxy group per molecule, (b) from 90 to 10 weight percent of a low molecular weight acrylyl crosslinker chosen from the group consisting of (i) di-, tri-, and tetra-functional acrylate or methacrylate esters of organic polyfunctional alcohols having a molecular weight of up to about 1200, and (ii) low molecular weight siloxane polyacrylates, and (c) from 0% to about 10% by weight of a photosensitizer.

The use of polysiloxanes with acrylate or methacrylate ester groups linked to SiC groups as radiation-curable coating materials for sheet-like carriers is described in, for example, U.S. Pat. Nos. 3,878,263; 4,064,286; 4,963,438; 4,908,274; 4,978,726; and 5,034,491. In the '274 patent, the polysiloxanes are prepared by reacting an epoxy-functional polysiloxane with acrylic or methacrylic acid. In the '726 patent, the polysiloxanes are obtained by reacting an epoxy-functionalized polysiloxane with an acrylic or methacrylic acid and a monocarboxylic acid free of double bonds capable of polymerizing. U.S. Pat. No. 4,963,438 describes acrylate containing polysiloxanes which are prepared by reacting polysiloxanes containing hydroxy-functional groups with a mixture of acrylic or methacrylic acid and a monocarboxylic acid which is free of double bonds capable of polymerizing.

It is desired to develop release coatings which can be applied to a substrate such as paper and used as a backing for a pressure-sensitive-coated laminate.

SUMMARY OF THE INVENTION

A radiation-curable silicone release composition is described which comprises (A) a mixture of organopolysiloxanes characterized by the formula

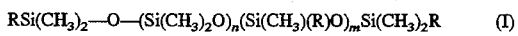

$$RSi(CH_3)_2-O-(Si(CH_3)_2O)_n(Si(CH_3)(R)O)_mSi(CH_3)_2R \qquad (I)$$

wherein the mixture comprises (A-1) from about 25% to 95% by weight of at least one organopolysiloxane characterized by Formula I wherein each R is $-R^1-O(O)C-C(R^2)=CH_2$, $R^1$ is a hydrocarbylene group, $R^2$ is hydrogen or a methyl or ethyl group, m is a number from about 1 to about 15, and n is a number from about 50 to about 300, and (A-2) from about 5% to 75% by weight of at least one other organopolysiloxane characterized by Formula I wherein R is $-R^1-OCH_2CH(OH)CH_2O-(O)C-C(R^2)=CH_2$, $R^1$ is a hydrocarbylene group, $R^2$ is hydrogen or a methyl or ethyl group, m is a number from about 1 to about 25, and n is a number from about 50 to about 300, and (B) from 0% to about 5% by weight of a photoinitiator. A method of producing silicone release-coated substrates, the release-coated articles thus produced, and multi-layer articles or constructions incorporating a silicone-release layer also are described. When the silicone compositions are cured such as by electron beam radiation, the cured compositions exhibit a desirable high and controlled release force at high speeds such as the speeds utilized in label processing.

DESCRIPTION OF THE PREFERRED EMBODIMENTS

The radiation-curable release compositions of the present invention comprise mixtures of at least two classes of organopolysiloxanes, and both classes may be represented by the formula

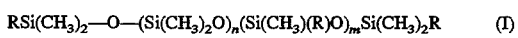

$$RSi(CH_3)_2-O-(Si(CH_3)_2O)_n(Si(CH_3)(R)O)_mSi(CH_3)_2R \qquad (I)$$

From about 25% to about 95%, or about 40% to about 80% by weight of at least one of the organopolysiloxanes present in the mixture is (A-1) characterized by Formula I wherein each R is $-R^1-O(O)C-C(R^2)=CH_2$, $R^1$ is a hydrocarbylene group, $R^2$ is hydrogen or a methyl or ethyl group, m is a number from about 1 to about 15, and n is a number from about 50 to about 300.

The mixtures of organopolysiloxanes present in the compositions of the present invention and characterized by Formula I also contain from about 5% to about 75%, or from about 20% to about 60% by weight of (A-2) at least one organopolysiloxane characterized by Formula I wherein each R is $-R^1-OCH_2CH(OH)CH_2O(O)C-C(R^2)=CH_2$, $R^1$ is a hydrocarbylene group, $R^2$ is hydrogen or a methyl or ethyl group, m is a number from about 1 to about 25, and n is a number from about 50 to about 300.

The hydrocarbylene groups $R^1$ in the above siloxanes may be divalent aliphatic or divalent aromatic groups containing up to about 10 carbon atoms, and specific examples of hydrocarbylene groups include it methylene, ethylene, propylene, butylene, hexylene, heptylene, phenylene, etc.

$R^2$ in the above organopolysiloxanes may be hydrogen or a methyl or ethyl group. Generally, $R^2$ is hydrogen. The organopolysiloxanes of (A-1) may contain from 3 to about 17 R groups since m is defined as from about 1 to about 15. Thus, the value of m determines the amount of acrylate present in the organopolysiloxanes.

The second organopolysiloxane (A-2) present in the silicone release compositions of the present invention also is defined by Formula I where each R is

$-R^1-OCH_2CH(OH)CH_2O(O)C-C(R^2)=CH_2$, wherein $R^1$ is a hydrocarbylene group as defined above, $R^2$ is hydrogen or a methyl or ethyl group, m is a number from about 1 to about 25, and n is a number from about 50 to about 300. The difference between the organopolysiloxane of (A-1) and the organopolysiloxane of (A-2) is that the R groups of the siloxane of (A-2) contain a 2-hydroxy-1-oxypropylene group which is not present in the R groups of the organopolysiloxane of (A-1), and the number of R groups in (A-2) may be as high as 27 (m=1-25).

The organopolysiloxanes of Formula I containing the acryloxy or methacryloxy groups represented by Formula I can be prepared, for example, by reacting a siloxane containing hydroxy groups or epoxy groups with acrylic acid or methacrylic acid. The siloxanes containing the 2-hydroxy-1-oxypropylene group can be prepared by reacting a reactive siloxane (e.g., containing halogen) with a polyhydroxy compound such as ethylene glycol, propylene glycol, glycerol, or pentaerythritol.

The organopolysiloxanes of Formula I containing acryloxy and/or methacryloxy groups as described above are known in the art, and various methods for producing such organopolysiloxanes are described in a number of patents. In particular, the disclosures of U.S. Pat. Nos. 4,908,274 and 4,963,438 are hereby incorporated by reference with their disclosure of acrylate or methacrylate containing organopolysiloxanes and methods of preparing such organopolysiloxanes.

Organopolysiloxanes containing acryloxy groups are available commercially from, for example, Goldschmidt Chemical Corp., Hopewell, Va. Goldschmidt's silicone acrylate series include dimethylpolysiloxanes available under the general trade designation TERGO®RC. A particular example of a useful polysiloxane of the type represented by Formula I (A-1) is available under the designation of RC-726. In particular, RC-726 is believed to be characterized by Formula I wherein each R is $-(CH_2)_6OC(O)CH=CH_2$, m is 6, and n is about 136. The molecular weight of RC-726 is about 11,000. This organopolysiloxane contains about 9% by weight of acrylate.

An example of the organopolysiloxane of Formula I (A-2) which is commercially available from Goldschmidt is RC-705. RC-705 is believed to be characterized by Formula I wherein R is $-(CH_2)_3OCH_2CH(OH)CH_2OC(O)CH=CH_2$, and this product contains about 45% by weight of acrylate.

The radiation-curable release compositions of the present invention optionally may contain at least one photoinitiator. The amount of photoinitiator included in the compositions of the invention may range from 0% to about 10%, more often 0% to about 5% by weight based on the total weight of the radiation-curable composition. A photoinitiator is incorporated into the curable compositions when compositions are to be cured by exposure to non-ionizing radiation such as ultraviolet light. Photoinitiators are not required when the curable silicone is cured by electron beam radiation.

Suitable photoinitiators include those compounds that produce free radicals which operate to polymerize and cure the compositions used in this invention. Examples of photoinitiators which may be used in combination with ultraviolet light includes, for example, benzyl ketals, benzoin ethers, acetophenone derivatives, ketoxime ethers, benzophenone, benzo or thioxanthones, etc. Specific examples of photoinitiators include: 2,2-diethoxyacetophenone; 2- or 3- or 4-bromoacetophenone; benzoin; benzophenone; 4-chlorobenzophenone; 4-phenylbenzophenone; benzoquinone; 1-chloroanthroquinone; p-diacetyl-benzene; 9,10-dibromoanthracene; 1,3-diphenyl- 2-propanone; 1,4-naphthylophenylketone; 2,3-pentenedione; propiophenone; chlorothioxanthone; xanthone; fluorenone; and mixtures thereof.

In addition to the organopolysiloxanes of Formula I and photoinitiators described above, the radiation-curable silicone release compositions of the present invention may contain (C) at least one acrylated or methacrylated organic polyhydroxy compound or polyamino compound. These compounds contain at least two acryloyl or acrylyl groups, or at least two methacryloyl or methacrylyl groups which form a network upon polymerization. Suitable compounds useful as component (C) include compounds represented by the general formula

$$R-(-CO-C(X)=CH_2)_n \qquad (II)$$

where R is derived from a polyhydroxy compound or a polyamine or an organic compound containing hydroxy groups and amino groups, and n is an integer of at least 2 and is preferably 2, 3 or 4. Throughout the specification and claims, the compounds represented by the general Formula II above will be further referred to as "acrylates" or "methacrylates" even though the compounds derived from polyamines form amides and not esters. The polyfunctional hydroxy and amino compounds which are reacted with acrylic or methacrylic acid contain at least 2 and as many as 4 or 5 hydroxy and/or amino groups. Generally the polyfunctional reactants contain from 2 to 4 and more often 2 or 3 hydroxy or amino groups.

The polyfunctional compounds containing at least 2 hydroxyl groups, 2 amino groups or both groups may be monomeric compounds such as ethylene glycol, diethylene glycol, 1,6-hexanediol, neopentyl glycol, trimethylolpropane, pentaerythritol, etc., or similar amine compounds such as ethylene diamine, 1,3-propanediamine, 1,4-butanediamine, 1,6-hexanediamine, dimethylenetriamine, dipropylenetriamine, triethylenetetramene, 5-amino-1-pentanol, and 3-amino-1- propanol. The polyalcohols and polyamines may also be oligomeric compounds such as dimeric, trimeric, or tetrameric polyhydroxy and polyamino compounds.

The acrylated or methacrylated organic polyhydroxy compounds or polyamino compounds (C) used in the release compositions of the present invention generally represented by the above Formula II may be prepared by techniques well known to those skilled in the art such as by the reaction of the polyhydroxy compound or polyamine compound or amino alcohol with acrylic acid or methacrylic acid in amounts to provide the desired di-, tri-, tetra-, or polyacrylated product. The molecular weights of the acrylated or methacrylated products (C) may be as high as 2000 and are generally below about 1200. It is preferred that these acrylated or methacrylated compounds are liquids which are not too viscous so that they will readily be blended into the organopolysiloxane mixture (A) and provide desired fluidity characteristics. In general, these compounds may have viscosities at 25° C. of from about 2 to about 2000 cps. The acrylates derived from polyhydroxy compounds generally have viscosities at 25° C. of from about 2 to about 500 cps, and more preferably between about 2 and 200.

Specific examples of acrylated or methacrylated organic polyhydroxy compounds include, for example, glycerol diacrylate, diethylene glycol diacrylate, 1,6-hexanediol diacrylate, triethylene glycol diacrylate, trimethylolpropane triacrylate, neopentylglycol di-, tri-, or tetra-acrylate, tripropylene glycol diacrylate, 1,6-hexanediol dimethacrylate, ethylene glycol dimethacrylate, etc.

Specific examples of acrylated or methacrylated organic polyamino compounds include, for example, N,N'-diacrylylethylenediamine, N,N'-diacrylyl-1,3-propanediamine, N,N'-dimethacrylyl-1,6-hexanediamine, etc. Useful acrylated and methacrylated polyhydroxy compounds and polyamino compounds are available commercially. An example of a commercially available acrylated amine product is Uvecryl® 7100, an acrylated amine oligomer available from UCB Radcure, Atlanta, Ga. This acrylate functional oligomeric amine is a liquid having a viscosity in the range of 500–1500 cps at 25° C. and theoretical molecular weight of 800.

The radiation-curable silicone release compositions of the present invention may contain from about 0% to about 60%, more often 10% to about 50% by weight of at least one of the above-described acrylated or methacrylated organic polyhydroxy compounds or polyamino compounds.

The silicone-release compositions of the present invention preferably comprise a mixture of more than one acrylated or methacrylated organic polyhydroxy compound or polyamino compound (C). Such mixtures may comprise two or more derivatives derived from polyhydroxy compounds, or two or more compounds derived from polyamino compounds, or mixtures of one or more compounds derived from a polyhydroxy compound and one or more compounds derived from a polyamino compound. Thus, in one embodiment, component (C) comprises a mixture of (1) from about 40% to about 70% by weight of at least one acrylated or methacrylated polyamine oligomer and (2) from about 30% to about 60% by weight of at least one acrylated or methacrylated polyhydroxy compound as described above.

In another embodiment of the present invention, a portion of the acrylated or methacrylated compound (C) may be replaced by a liquid monoacrylate ester. For example, from about 1% to about 20% by weight of the polyacrylate in the above mixtures may be replaced by a liquid monoacrylate ester to modify the properties of the radiation-curable silicone release composition and, in some instances, the properties of the radiation-cured release composition. The liquid monoacrylate esters generally are characterized by a low viscosity such as from 1 to about 50 cps at 25° C., and these monoacrylate compounds are useful to improve the fluidity of the curable release compositions of the invention. Examples of such liquid monoacrylate esters include ethyl acrylate, butyl acrylate, 2-ethylhexyl acrylate, allyl acrylate, n-amyl acrylate, n-octyl acrylate, n-decyl acrylate, benzyl acrylate, cyclohexyl acrylate, diethylaminoethyl acrylate, 2-ethoxyethyl acrylate, n-lauryl acrylate, octadecyl acrylate, etc., the corresponding methacrylates and mixtures thereof.

The monoacrylate and methacrylate compounds do not form a network when polymerized by radiation. However, the monoacrylates do modify the network formed by the polyfunctional acrylates of (C). These monoacrylate compounds normally copolymerize with the polyfunctional acrylates and methacrylates.

The radiation-curable release compositions of the present invention are produced by mixing the above-described components. The components may be mixed at room temperature with stirring, and mild heating may be employed in some instances to facilitate mixing. Since the components of the composition may undergo some separation during storage, mild agitation or mixing just prior to use is effective to redisperse the components and is recommended.

The radiation-curable compositions of the present invention can be stabilized against premature polymerization during storage by the addition of conventional polymerization inhibitors such as hydroquinone, monomethylether of hydroquinone, phenothiazine, di-t-butyl paracresol, etc. Amounts of 0.1 weight percent or less of the stabilizers are generally effective.

The following examples illustrate the radiation-curable compositions of the present invention. Unless otherwise indicated in the following examples and elsewhere in the specification and claims, all parts and percentages are by weight, temperatures are in degrees Centigrade, and pressures are at or near atmospheric pressure.

|  | %/Wt. |
|---|---|
| Example 1 | |
| RC-726 silicone | 70 |
| RC-705 silicone | 30 |
| Example 2 | |
| RC-726 silicone | 50 |
| RC-705 silicone | 50 |
| Example 3 | |
| RC-726 silicone | 70 |
| RC-705 silicone | 29 |
| Benzophenone | 1 |
| Example 4 | |
| RC-726 silicone | 90 |
| RC-705 silicone | 5 |
| Trimethylol propane triacrylate (TMPTA) | 5 |
| Example 5 | |
| RC-726 silicone | 80 |
| RC-705 silicone | 10 |
| TMPTA | 5 |
| Hexanedioldiacrylate (HDODA) | 5 |
| Example 6 | |
| RC-726 silicone | 60 |
| RC-705 silicone | 20 |
| Uvecryl 7100 | 10 |

-continued

|  | %/Wt. |
| --- | --- |
| TMPTA | 5 |
| HDODA | 5 |
| Example 7 | |
| RC-726 silicone | 75 |
| RC-705 silicone | 10 |
| TMPTA | 5 |
| HDODA | 5 |
| ODA (mixture of octyl and decylacrylates) | 5 |

The radiation-curable release compositions of the present invention generally are applied to a substrate prior to curing. The compositions may be applied to a substrate as a coating by any conventional means known in the coating art such as roller coating, curtain coating, brushing, spraying, reverse roll coating, doctor knife, dipping, die coating, etc. In one particular embodiment, the liquid, radiation-curable compositions of the invention are applied to a substrate using offset gravure techniques. The liquid being applied to the substrate may be heated or cooled to facilitate the coating process and to alter the depth of the penetration of the liquid coated into the substrate prior to curing.

A variety of substrates can be coated with the radiation-curable release coatings of the present invention, and the compositions can be applied to any substrate when it is desirable to modify the release properties of a surface of the substrate. For example, the compositions of the present invention can be employed to form release coatings on substrates such as paper, vinyl, polyvinyl chloride films, polyester films, polyolefin films, non-woven fabrics, glass, steel, aluminum, etc. Included among the types of paper which can be used is paper, clay coated paper, glassine, polymer coated paper, paperboard from straw, bark, wood, cotton, flax, cornstalks, sugarcane, bagasse, bamboo, hemp, and similar cellulose materials prepared by such processes as the soda, sulfite or sulfate (Kraft) processes, the neutral sulfide cooking process, alkali-chlorine processes, nitric acid processes, semi-chemical processes, etc. Although paper of any weight can be employed as a substrate material, paper having weights in the range of from about 20 to about 150 pounds per ream are useful, and papers having weights in the range of from about 30 to about 60 pounds per ream are presently preferred. The term "ream" as used herein equals 3000 square feet. Examples of specific papers which can be utilized as substrates in preparing the composite laminates of the present invention include Kraft papers such as 40-pound and 50-pound bleached Kraft papers; 41-pound offset grade bleached Kraft paper; etc. The present invention is particularly useful in providing release characteristics to paper and polymeric films.

The mount of radiation-curable silicone release compositions of the invention applied to the various substrates varies depending upon the characteristics of the substrate, the properties desired in the release coating, the radiation source utilized, and the particular formulation of the release composition. If an excess of the coating composition is applied to the substrate, the physical characteristics of the substrate may be affected in an undesirable manner. Also, for economic reasons, it is normally desired to apply the lowest mount of coating to obtain the desired result. Thus, applied coating weights may, depending on the substrate and intended use, range from about 0.1 to about 10 or more grams/m$^2$. In general, when it is desired to produce a silicone release-coated paper useful as a protective cover for a pressure-sensitive adhesive tape, applied coating weights are from about 1 to about 3 grams/m$^2$. At these levels, desirable high release characteristics are obtained without distorting the essential components of the substrate so that a flat construction which has good performance in the end use can be produced.

The release compositions of the present invention can be cured by exposure to known forms of ionizing or actinic non-ionizing radiation. Useful types of radiation include ultraviolet light, electron beam, x-ray, gamma-ray, beta-ray, etc. If ultraviolet light is to be used as the form of radiation, a photoinitiator such as described above is included in the curable release composition. Photoinitiators are not required for electron beam curing. One of the advantages of using radiation to effect cure of the composition is that polymerization. Lakes place rapidly at ambient temperature, and heating is not necessary. The equipment for generating these forms of radiation are well known to those skilled in the art. Electron beam radiation is the presently preferred form of radiation to be used with the compositions of the present invention.

Curing of the release compositions of the present invention can be effected in a continuous manner by passing the release-coated substrate through radiation equipment which is designed to provide the coated substrate with sufficient residence time to complete the cure of the coating. Curing may be effected in an air atmosphere or in an inert atmosphere such as nitrogen or argon. An inert atmosphere is preferred. The length of exposure necessary to cure the release compositions of the present invention varies with such factors as the particular formulation used, type and wavelength of radiation, dose rate, energy flux, concentration of photoinitiator (when required), the atmosphere and thickness of the coating. A total dosage of from about 0.2 to 10 megarads, preferably below 4 megarads is sufficient to cure the silicone release compositions. Generally, the exposure is quite brief and curing is completed in about 0.1 to about 3 seconds. The actual exposure time required to give proper curing for various release compositions can be readily determined by one skilled in the art with a minimum of experimentation. Excess curing of the release compositions should generally be avoided.

Substrates which have been coated with the silicone release compositions of the present invention and cured exhibit desirable high and controlled release properties, the release coating is resistant to moisture and solvents, and the coating is thermally stable. As indicated previously, a substrate which is coated with the cured silicone release composition of the present invention can be used as a protective covering for a second substrate having pressure-sensitive adhesive coating on its surface. The protective covering is normally applied to the adhesive-coated substrate by bringing the two coated substrates into surface-to-surface contact with the silicone release coating on the first substrate in contact with the pressure-sensitive adhesive on the second substrate. Application of a slight pressure is usually effective to cause the coated substrates to adhere together forming a four-layered laminate. When a silicone-coated release paper prepared in accordance with the present invention is used as a protective covering on a pressure-sensitive adhesive tape, a desirable high-release force is required before the release-coated paper will separate from the adhesive tape, and there is little transfer of the silicone release coating from the paper onto the adhesive. The silane composition of the present invention is useful particularly to prepare coated papers which are useful in high-speed equipment such as labeling equipment where a high release force is desired at the high peel rates utilized.

Accordingly, the present invention contemplates the use of the silane compositions described above in the preparation of multi-layer articles or constructions comprising (a) a first substrate; (b) a second substrate; (c) a silicone release layer comprising the release coating composition of this invention which has been cured by exposure to radiation; and (d) a layer comprising a pressure-sensitive adhesive composition, wherein the release layer (c) is interposed between the first substrate and the layer of pressure-sensitive adhesive and is preferentially adherent to the first substrate, and the pressure-sensitive adhesive layer (d) is interposed between the release layer and the second substrate and is preferentially adherent to the second substrate. Additional layers can be interdispersed between the first substrate and the layer of pressure-sensitive adhesive and between the second substrate and the silicone release layer to provide additional desirable properties such as increased strength, increased dimensional stability, etc. As in other applications described above, the first and second substrates may comprise a variety of materials including paper, polyolefins, vinyl, polyester, aluminum, etc., although substrates such as vinyl, polyolefins and paper are preferred.

With reference to the multi-layered articles or constructions utilizing at least one layer of a pressure-sensitive adhesive composition, any pressure-sensitive adhesive composition known in the art can be utilized. Such adhesive compositions are described in, for example, "Adhesion and Bonding", *Encyclopedia of Polymer Science and Engineering*, Vol. 1, pages 476–546, Interscience Publishers, 2nd Ed. 1985. Such compositions generally contain an adhesive polymer such as natural, reclaimed or styrene-butadiene rubber, styrene butadiene or styrene isoprene block copolymers, polyisobutylene, poly(vinyl ether) or poly(acrylic) ester as a major constituent. Other materials may be included in the pressure-sensitive adhesive compositions such as resin tackifiers including, for example: rosin esters, off-soluble phenolics, or polyterpenes; antioxidants; plasticizers such as mineral oil or liquid polyisobutylenes; and fillers such as zinc oxide or hydrated alumina. The selection of the pressure-sensitive adhesive to be used in any particular multi-layer article or construction is not critical to this invention, and those skilled in the art are familiar with many suitable pressure-sensitive adhesives. However, as known to those skilled in the art, the pressure-sensitive adhesive and the release layer should not chemically react.

The radiation-curable silicone release compositions of this invention provide cured coatings and films which have excellent release characteristics, and when applied to a substrate such as paper, the coated paper exhibits improved dimensional stability under varying conditions such as temperature, humidity, aging, etc. A particularly desirable property of substrates such as paper which have been coated with the release compositions of this invention and constructions such as labels prepared therefrom is that they lay flat and remain flat over time, even when exposed to moisture and low or high temperatures. The surface characteristics of the coated construction allows for printing by laser printers providing good toner anchorage and printing by flexographic techniques, when used in combination with generally available primers, print inks and over-varnishes.

The improved high release properties exhibited by the release compositions of this invention at high operating speeds are illustrated by applying the silicone compositions of Examples 1 and 2 to 40 pound Kraft paper at an approximate coating weight of one pound per ream. The coatings are cured by exposure to an electron beam.

The silicone side of the silicone-coated paper is then laminated under pressure to the adhesive side of a liner of 40 pound Kraft paper coated with either (a) a solvent-based styrene-butadiene adhesive or (b) a hot melt, styrene-isoprene-styrene triblock adhesive.

After aging the laminate for 24 hours at 23° C. the release force, measured in grams per 2-inch width, required to separate the laminates at the silicone-adhesive interface by pulling the tape from the liner at an angle of 180° is determined at increasing peel rates (meters/sec.).

The results are summa in the following tables. For comparison purposes a control laminate (Control) is prepared which is identical to the above laminates of the invention except that the silicone-release coating is prepared from RC450N, available from Goldschmidt and believed to have the general structure $$R-Si(CH_3)_2O[Si(CH_3)_2O]_nSi(CH_3)_2R$$

where each R is —$OCH_2C(CH_2OC(O)CH=CH_2)_3$, is about 40, and the silicone contains about 15% acrylate. Silicones like RC450N are described in U.S. Pat. No. 5,034,491.

TABLE I

Release Forces of Solvent Rubber-Based Adhesive

| Test Speed | | Silicone Example | | |
|---|---|---|---|---|
| in/min | meters/sec. | 1 | 2 | Control |
| | | Results (gram force/2-in) | | |
| 100 | 0.043 | 76.0 | 61.2 | 54.6 |
| 300 | 0.127 | 76.8 | 81.7 | 63.4 |
| 1200 | 0.508 | 103.9 | 100.7 | 56.2 |
| 2400 | 1.016 | 120.7 | 106.8 | 62.5 |
| 4800 | 2.032 | 91.2 | 91.1 | 55.8 |
| 9000 | 3.810 | 88.1 | 84.5 | 52.0 |

TABLE II

Release Forces of Hot Melt Rubber-Based Adhesive

| Test Speed | | Silicone Example | | |
|---|---|---|---|---|
| in/min | meters/sec. | 1 | 2 | Control |
| | | Results (gram force/2-in) | | |
| 100 | 0.043 | 21.1 | 25.9 | 39.4 |
| 300 | 0.127 | 25.4 | 31.8 | 28.1 |
| 1200 | 0.508 | 41.0 | 49.5 | 24.6 |
| 2400 | 1.016 | 44.7 | 47.0 | 23.3 |
| 4800 | 2.032 | 40.2 | 38.2 | 21.2 |
| 9000 | 3.810 | 35.4 | 36.2 | 23.7 |

The results shown in Tables I and II demonstrate the high release force exhibited by the silicones of the invention when compared to the Control Such high release forces are desirable in high-speed processes wherein it is critical that the release force is higher at increased peel rates.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

We claim:

1. A release-coated article comprising a substrate which has been coated with a radiation-curable release composition and which has been cured by exposure to radiation, said release composition comprising, (A) a mixture of organopolysiloxanes characterized by the formula

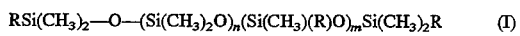

wherein the mixture comprises
(A-1) from about 25% to 95% by weight of at least one organopolysiloxane characterized by Formula I wherein each R is —$R^1$—O(O)C—C($R^2$)=$CH_2$, $R^1$ is a hydrocarbylene group, $R^2$ is hydrogen or a methyl or ethyl group, m is an integer from 1 to about 15, and n is an integer from about 50 to about 300, and
(A-2) from about 5% to 75% by weight of at least one other organopolysiloxane characterized by Formula I wherein each R is —$R^1$—$OCH_2CH(OH)CH_2O$(O)C—C($R^2$)=$CH_2$, $R^1$ is a hydrocarbylene group, $R^2$ is hydrogen or a methyl or ethyl group, m is an integer from 1 to about 25, and n is an integer from about 50 to about 300, and
(B) from 0% to about 5% by weight of a photoinitiator.

2. The release-coated article of claim 1 wherein the substrate is paper.

3. The release-coated article of claim 1 wherein the release composition contains from about 40% to about 80% by weight of (a-1) and from about 20% to about 60% by weight of (a-2).

4. The release-coated article of claim 1 wherein $R^1$ is a divalent aliphatic group containing from 1 to about 10 carbon atoms.

5. The release-coated article of claim 1 wherein each $R^2$ is hydrogen.

6. The release-coated article of claim 1 wherein the release composition also contains at least one liquid organic monoacrylate ester compound.

7. The release-coated article of claim 1 wherein the release composition is curable by electron beam irradiation.

8. A multilayer article comprising (A) a first substrate;

(B) a second substrate;

(C) a silicone release layer comprising the silicone release composition comprising (a) a mixture of organopolysiloxanes characterized by the formula

wherein the mixture comprises
(a-1) from about 25% to 95% by weight of at least one organopolysiloxane characterized by Formula I wherein each R is —$R^1$—O(O)C—C($R^2$)=$CH_2$, $R^1$ is a hydrocarbylene group, $R^2$ is hydrogen or a methyl or ethyl group, m is an integer from 1 to about 15, and n is an integer from about 50 to about 300, and
(a-2) from about 5% to 75% by weight of at least one other organopolysiloxane characterized by Formula I wherein each R is —$R^1$—$OCH_2CH(OH)CH_2O$(O)C—C($R^2$)=$CH_2$, $R^1$ is a hydrocarbylene group, $R^2$ is hydrogen or a methyl or ethyl group, m is an integer from 1 to about 25, and n is an integer from about 50 to about 300, and
(b) from 0% to about 5% by weight of a photoinitiator which release composition has been cured by exposure to radiation; and (D) a pressure-sensitive adhesive layer, wherein the silicone release layer (C) is interposed between and adhered to the first substrate and the layer of pressure-sensitive adhesive (D), and the pressure sensitive adhesive layer (D) is interposed between and adhered to the release layer and the second substrate.

9. The multilayer article of claim 8 wherein the first and second substrates are paper.

10. A multilayer article comprising (A) a first substrate;

(B) a second substrate;

(C) a silicone release layer comprising the silicone release composition comprising (a) a mixture of organopolysiloxanes characterized by the formula

wherein the mixture comprises
(a-1) from about 25% to 95% by weight of at least one organopolysiloxane characterized by Formula I wherein each R is —$R^1$—O(O)C—C($R^2$)=$CH_2$, $R^1$ is a hydrocarbylene group, $R^2$ is hydrogen or a methyl or ethyl group, m is an integer from 1 to about 15, and n is an integer from about 50 to about 300, and
(a-2) from about 5% to 75% by weight of at least one other organopolysiloxane characterized by Formula I wherein each R is —$R^1$—$OCH_2CH(OH)CH_2O$(O)C—C($R^2$)=$CH_2$, $R^1$ is a hydrocarbylene group, $R^2$ is hydrogen or a methyl or ethyl group, m is an integer from 1 to about 25, and n is an integer from about 50 to about 300, and
(a-3) at least one acrylated or methacrylated organic polyhydroxy compound or polyamino compound, and (b) from 0% to about 5% by weight of a photoinitiator which release composition has been cured by exposure to radiation; and (D) a pressure-sensitive adhesive layer, wherein the silicone release layer (C) is interposed between and adhered to the first substrate and the layer of pressure-sensitive adhesive (D), and the pressure sensitive adhesive layer (D) is interposed between and adhered to the release layer and the second substrate.

11. The release-coated article of claim 10 wherein the release composition contains at least one acrylated or methacrylated polyhydroxy compound.

* * * * *